United States Patent

Kirsch

[15] 3,683,960
[45] Aug. 15, 1972

[54] BLOCK MANIFOLD FOR FLUID CONTROL SYSTEMS AND METHOD OF MAKING THE SAME

[72] Inventor: Jerry Kirsch, 36 Beacon Hill, Grosse Pointe Farms, Mich. 48236

[22] Filed: Nov. 19, 1970

[21] Appl. No.: 91,077

[52] U.S. Cl.................................137/594, 264/277
[51] Int. Cl..............................................F16k 11/10
[58] Field of Search ......264/277; 137/375, 559, 594, 137/595, 608, 561

[56] References Cited

UNITED STATES PATENTS

| | | | |
|---|---|---|---|
| 2,949,130 | 8/1960 | Knight et al. | 137/559 X |
| 3,038,495 | 6/1962 | Fortin | 137/559 |
| 3,331,392 | 7/1967 | Davidson et al. | 137/559 |
| 3,357,599 | 12/1967 | Douglas et al. | 137/561 X |
| 3,360,008 | 12/1967 | Papale et al. | 137/594 |
| 3,367,358 | 2/1968 | Rentschler | 137/375 |
| 3,559,674 | 2/1971 | Ostwald | 137/608 X |

*Primary Examiner*—Henry T. Klinksiek
*Attorney*—Barthel & Bugbee

[57] ABSTRACT

A mold is prepared with separable side and top walls having plugs, pipe couplings or barbed tube connectors seated in the walls thereof. The ends of tubes, preferably of flexible plastic material, are slipped over the ends of these plugs, pipe couplings or barbed tube connectors within the mold cavity. A protective coating or "release coating" is placed on the inner surface of the mold to prevent adhesion of plastic to the mold walls, whereupon synthetic plastic, preferably transparent, in a fluid state is poured into the mold cavity - preferably the two epoxy resin fluids which, when combined and allowed to set produce a solid transparent epoxy resin body. The synthetic plastic material in which the tubes are thus embedded is permitted to solidify, after which the walls of the mold are withdrawn, leaving the preferably transparent synthetic plastic block with the ends of the tubes or the couplings attached thereto exposed at the sides of the block. Tee couplings connected to such tubes may optionally be embedded in the plastic body. The various conduits of a fluid system as well as valves may then be connected to the tubes or mounted on and secured to the block in communication with the ports provided by the exposed open ends of certain of the tubes, thereby compressing into a very small space tube circuits which would otherwise occupy a much larger space. Changes in the circuit are easily made by shifting the external circuit tubes between different sets of connections, couplings or ports.

5 Claims, 13 Drawing Figures

Patented Aug. 15, 1972

INVENTOR
JERRY KIRSCH

BY Barthel & Bugbee

ATTORNEYS

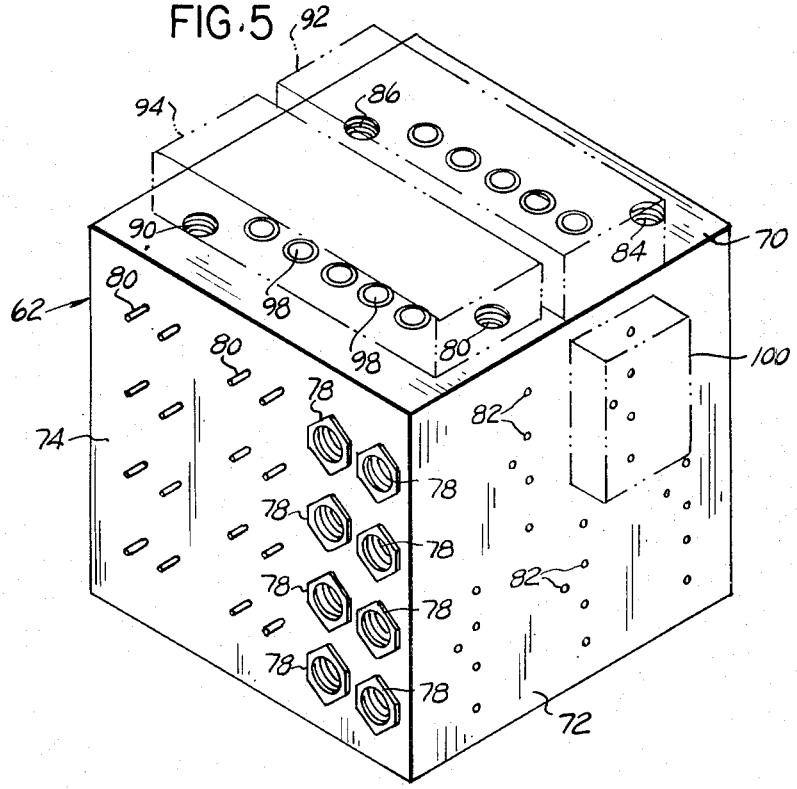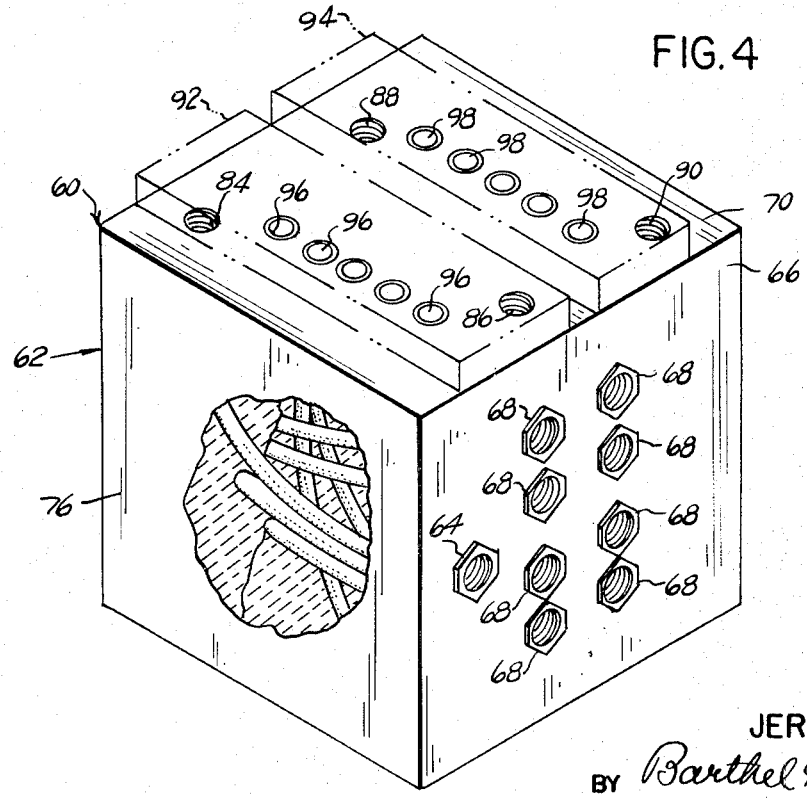

INVENTOR
JERRY KIRSCH
BY Barthel & Bugbee
ATTORNEYS

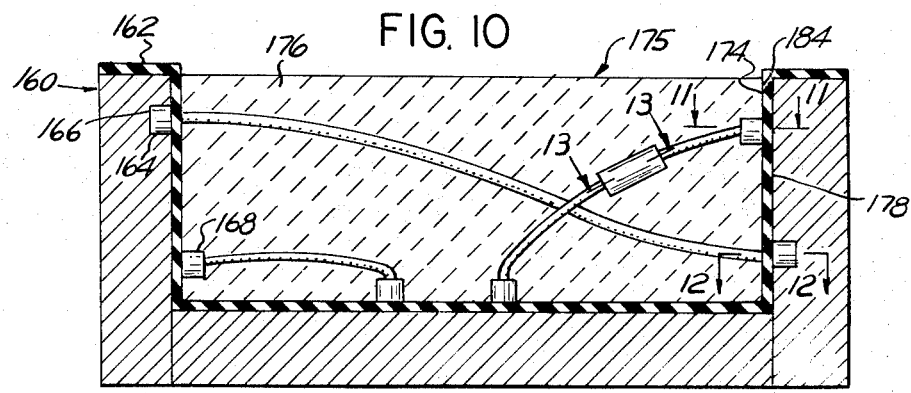

BLOCK MANIFOLD FOR FLUID CONTROL SYSTEMS AND METHOD OF MAKING THE SAME

BACKGROUND AND SUMMARY OF THE INVENTION

Hitherto, various means have been provided for centralized connections in air-logic control systems as well as in hydraulic and pneumatic control systems. One such arrangement has been the intertwining of individual pipes or tubes leading to the various parts in the circuit. This, however, has resulted in a maze of such intertwined pipes or tubes which not only is confusing to the designer and installer but is also open to damage or displacement by being exposed to the open air and to any movement or collision with moving objects. A second arrangement seeking to overcome the disadvantages of the intertwined exposed separate pipes or tubes has employed a manifold made up of metal plates, such as aluminum plates, with passageways machined therein as by routing, after which the plates are bolted together. The manufacture of such a manifold is very costly and the result is always subject to possible leakage. A third arrangement forms a manifold from gasket material which has been slotted to provide such passageways. This likewise is expensive to make because of the high labor cost involved and is still subject to leakage although to a lesser extent than the bolted-together metal plates.

The present invention, by embedding the separate tubes or pipes and possible couplings, check valves or the like connected thereto within a solid plastic block, avoids the disadvantages present in each of the prior arrangements. In particular, the plastic block manifold of the present invention prevents such leakage, is much less costly to manufacture, the embedded tubes cannot be cut or otherwise damaged and can never be displaced from their original embedded positions. Furthermore, if the manifold block of the present invention is made from transparent plastic, the tubes embedded therein are easily visible, their paths can be traced visually, and any blockage or presence of air bubbles or foreign matter easily detected.

In the drawings,

FIG. 4 is a front perspective view of a more complicated block manifold constructed according to the principles of the invention shown in FIGS. 1, 2 and 3 with one side wall broken away to disclose some of the tubing in the interior thereof;

FIG. 5 is a rear perspective view of the block manifold shown in FIG. 4;

FIG. 10 is a view similar to FIG. 1, but showing a modification, upon a reduced scale, of a plastic block manifold which has been poured into an elastomer-lined mold, likewise simplified by showing only a few tubes mounted therein, before removal of the manifold from the mold;

FIG. 11 is an enlarged horizontal section taken along the line 11—11 in FIG. 10, showing a tube end seated in a socket having its side walls projecting into the mold;

FIG. 12 is an enlarged horizontal section taken along the line 12—12 in FIG. 10, showing a tube end seated in a socket having its side walls recessed into the mold wall; and FIG. 13 is an enlarged horizontal section taken along the line 13—13 in FIG. 10 showing a spring-pressed ball check valve embedded in the block manifold.

Figure 1:
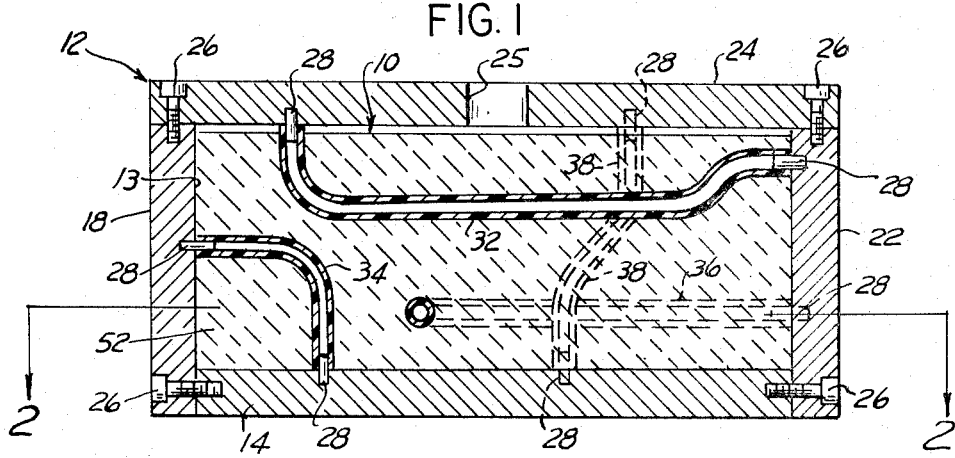
FIG. 1 is a vertical section through a mold showing diagrammatically a plastic block manifold according to the invention, simplified to facilitate understanding thereof by showing only a few tubes mounted therein, before removal of the manifold from the mold.
Figure 2:
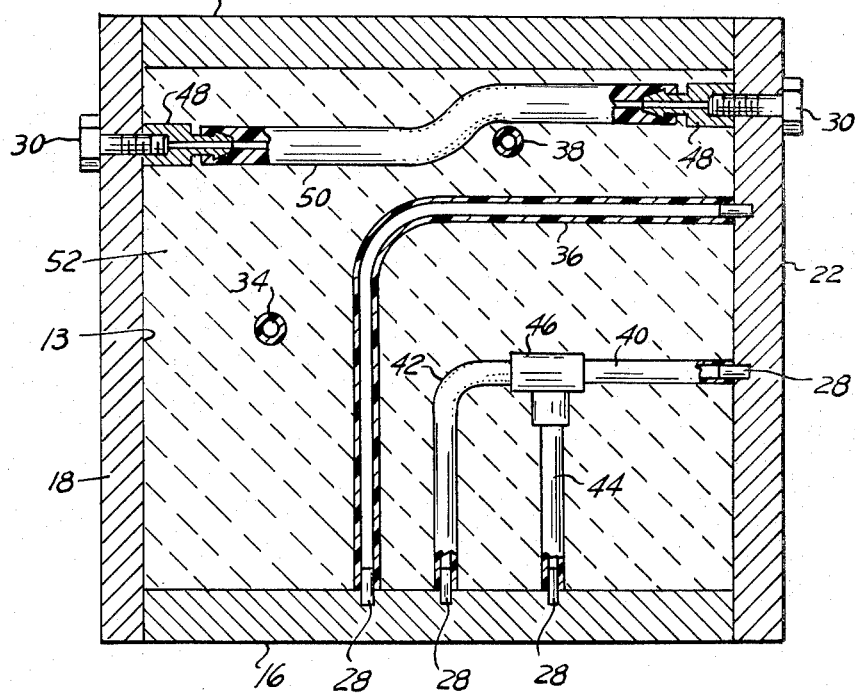
FIG. 2 is a horizontal section taken along the line 2—2 in FIG. 1.
Figure 3:
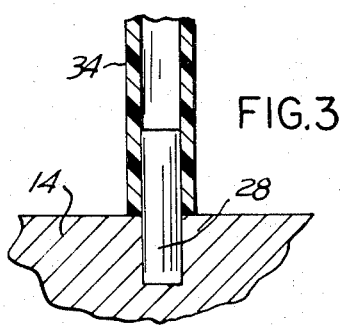
FIG. 3 is an enlarged fragmentary view of one of the manifold walls with a plug therein closing the end of a fluid circuit tube, as shown on a smaller scale near the lower left-hand corner of FIG. 1.

Referring to the drawings in detail, FIGS. 1, 2 and 3 show a fluid control system block manifold, generally designated 10, located within a separable mold 12 containing a mold cavity or chamber 13 in which it has been formed and from which it is about to be removed. The mold 12 is shown as consisting of a bottom wall plate 14, side wall plates 16, 18, 20 and 22, and a top wall plate 24 with a filling opening 25, all of these wall plates being drilled and, where necessary, also threaded in order to receive fasteners 26 by means of which the mold 12 can be disassembled in order to remove the manifold 10 therefrom. While the fasteners 26 are shown for simplicity as screws, in actual manufacture conventional quick-acting clamps (not shown) are preferably used in order to enable a more rapid assembly and disassembly of the mold 12, in order to shorten the cycle of manufacture. The mold top wall plate 24, side wall plates 16, 18, and 22 and bottom wall plate 14 are bored part way therethrough to receive plugs 28 over the exposed ends of which the ends of tubes are subsequently to be pushed, as described below. The side wall plates 18 and 22 are additionally bored to receive cap screws 30 which are subsequently threaded into pipe couplings, also as described below. The remaining construction of the simplified block manifold 10 is conveniently described in connection with the description of the method of its manufacture.

In making the block manifold 10, let it be assumed that the various wall plates 14 to 24 have been drilled and their respective plugs 28 inserted at the locations between which are to run the tubes 32, 34, 36, 38 (FIG. 1), 40, 42, and 44 (FIG. 2), subsequently to be embedded in the manifold 10. Their number and locations will of course be determined by the nature of the manifold 10 and the number of connections to be made, as well as the locations of such connections. Let it also be assumed that the tube 40 branches into tubes 42 and 44 at a Tee connection 46, it being understood that more of such Tee connections may be used according to the nature of the circuit. The operator then secures conventional internally-threaded tube couplings 48 to the opposite side wall plates 18 and 22 by threading the cap screws 30 through the side wall plates 18 and 22 into their respective couplings 48 (FIG. 2) and connects between them the tube 50 by pushing its ends onto the inner ends of the coupling 48. It will be further understood that the upper ends of the tubes 32 and 38 are slipped over their respective plugs 28 just as the top wall plate 24 is about to be secured to the side wall plates 16, 18, 20 and 22.

With the components of the mold 12 thus assembled and secured in position, and with their inner surfaces coated with a suitable release coating adapted to prevent adherence of the plastic to the walls, the operator then pours into the mold cavity 13 through the filling opening 25 the liquid plastic or synthetic resin until it fills the mold cavity 13. A cold plastic filling is preferably employed by pouring in the two epoxy resin components in liquid form which, when combined, form epoxy resin which upon hardening becomes a rigid solid plastic manifold block 52. If a thermosetting plastic is employed, however, the warm liquid plastic is poured through the filling opening 25 and allowed to cool and solidify.

When the plastic has sufficiently solidified to become the self-sustaining plastic block 52, the operator removes the fasteners 26 and 30 and withdraws the top wall plate 24 and side wall plates 16, 18, 20 and 22 away from the thus-formed block manifold 10, the plugs 28 by this action being pulled out of the exposed ends of the various tubes into which they have been temporarily inserted in order to exclude plastic therefrom during the molding operation.

The block manifold 10 is then lifted off the bottom wall plate 14, thereby disconnecting and withdrawing the plugs 28 mounted therein from the tubes 34 and 38 now embedded in the solidified plastic block 52. The block manifold 10 is now ready for use and the various pipes or tubes (not shown) leading externally to the remainder of the pneumatic or fluidic circuit are then connected to the exposed ends of the embedded tubes 32 to 44 inclusive. If a transparent plastic is employed in the formation of the block 52, the block manifold 80 then has the advantage that the various tubes 32 to 44 become visible and their paths can be traced between the points at which they emerge from the block 52. As a further means of identifying the various tubes and distinguishing them from one another, the differently colored tubes have been used in the manifold blocks actually constructed in accordance with this invention.

For smaller diameter tubes, polyurethane plastic tubes have been successfully used in this invention and have been found to be tough and durable. For larger diameter tubes, polyethylene plastic tubes have also been successfully used in this invention. Where epoxy resin is employed, the placing of the mold 12 and its contents in an oven at 180° F. for approximately one-half hour has been found to accelerate the hardening of epoxy resin; otherwise a period of approximately 24 hours is preferred for hardening without applying external heat. If the tubes are also made of a transparent or translucent plastic, in the subsequent operation of the manifold 10 the tubes can be checked visually for the presence of dirt, water, air bubbles or other undesired substances. Furthermore, when changes in the external circuit are made, the operator can trace visually the internal courses of the circuit within the block 52 by visual inspection.

As a further optional refinement, valves such as plastic or metal logic valves or check valves can also be encapsulated in the block 52 and their ports connected by tubes to exposed ports at the exterior of the block 52. Since the plastic material of which the block 52 is constructed lends itself to machining operations such as drilling, reaming, tapping, the synthetic plastic block 52 may be machined in order to mount, on the manifold 10, valve connecting tubes, port liners, pipe couplings, barbed tube fittings and press-fitted elements such as bushings. Bores formed in this manner can also be sunk through the block 52 into the tubes intermediate their exposed ends so as to establish communication therewith from another external location. In such instances, the ends of one or more of the tubes can be terminated within the block 52 rather than brought out to the external surface or surfaces thereof. To prevent the inflow of plastic material into such tubes during the casting procedure, the end or ends of the tube may be blocked off by tying a knot therein. As the plugs 28 are located at the terminal points of the tubes, they may be designated according to a predetermined code, such as by numerals, so that their interconnections can be easily identified by the operator when mounting the tubes in the mold cavity 13 prior to casting.

To minimize or prevent adhesion of the plastic material of the block 52 to the mold walls or to the plugs 28, the mold 12 may be made of ceramic material, such as glass, or constructed of highly polished or plated metal, chromium plating being preferred. This also produces an exceptionally smooth surface which enhances the transparency of the block 52 by increasing the high quality of the surfaces thereof. Various types of so-called mold release compounds are known to those skilled in this art and are available on the open market. One such mold release compounds which has been found successful in this invention for preventing adherence of the synthetic plastic material to the mold walls is made and sold under the trade name "Vibrin" by Cadillac Plastic and Chemical Company, 15111 Second Avenue, Highland Park, Michigan.

The block manifold, generally designated 60, shown in FIGS. 4 and 5, is an actual manifold made according to this invention as described above for use in a complex air logic circuit employed in connection with a universally-movable work handling device of the type shown in the Kirsch et al U.S. Pat. No. 3,406,837 issued Oct. 22, 1968 for Lifting and Swinging Work Transfer Device. The block manifold 60 is used in connection with an air logic circuit for controlling the device. The manifold block 62 which houses the tubes embedded therein is provided with an embedded internally-threaded pipe coupling 64 on its front face 66 adapted to be connected to a compressed air supply line, and beside it are internally-threaded pipe couplings 68 likewise embedded in the block 62 and adapted to be connected by suitable piping to various pneumatic cylinders (not shown). The block 62 also has a top face 70, a rear face 72, and opposite side faces 74 and 76 respectively. The side face 74 has embedded therein internally-threaded pipe couplings 78 similar to the pipe couplings 68 and connected thereto by tubes (not shown) embedded in the synthetic plastic block 62. Projecting from the side face 74 (FIG. 5) are barbed metallic tube couplings 80, the annularly barbed ends of which are adapted to receive and tightly grip the ends of external tubes (not shown) of resilient material, such as resilient synthetic plastic or synthetic rubber. These tube couplings 80 within the block 62 are connected to small tubes which terminate at ports 82 on the rear face 72 of the block 62 and are employed for quickly and easily making changes in the sequence of operations controlled by the circuitry. Because of the numerous couplings and ports on the exterior of the block 62 and since each of these represents the terminus of one end of a tube embedded in the interior of the block 62, it will be evident that it would be impractical in a drawing or even a series of drawings to show the paths of individual tubes because of their being closely packed together and intertwined with one another. For this reason, the side face 76 of the block 62 has been broken away to indicate to some extent how these tubes are intertwined and the complex pattern which they present.

The block 62 is also provided with internally-threaded blind bores or sockets 84, 86, 88 and 90 which serve to receive bolts (not shown) by which external units 92 and 94, shown in phantom lines, may be attached to the blocks over the two sets of ports 96 and 98 so as to communicate therewith. The units 92 and 94, for example, may consist of valve units, such as conventional spool valves 92, 94 of the four-way type, whereas similar but smaller valves 100, such as time-delay valves, may be similarly secured to the rear face 72 to communicate with and control the ports 82 therein.

The installation of the block manifold 10 of the present invention is believed to be clear and self-evident from the foregoing description of the construction thereof. Certain of the pipes leading to the remainder of the circuit are provided with externally-threaded couplings which are threaded into the internally-threaded couplings 68 and 78 according to the layout of the circuit. The valves 92 and 94 are bolted into their respective holes 84, 86 and 88, 90 so that they communicate with their respective ports 96 and 98 which, as previously stated, comprise the open ends of certain tubes embedded in the plastic block 62. In a similar manner, the valve or valves 100 are likewise attached to the face 72 so as to communicate with the ports 82 therein. Tubes controlling the sequence of operation of the controlled device, such as work transfer device, are connected to the barbed tube couplings 80 projecting from the face 74 of the block 62, the annular barbs on the ends of these tubular members 80 enhancing their grip upon the respective tubes connected thereto.

Figure 6:
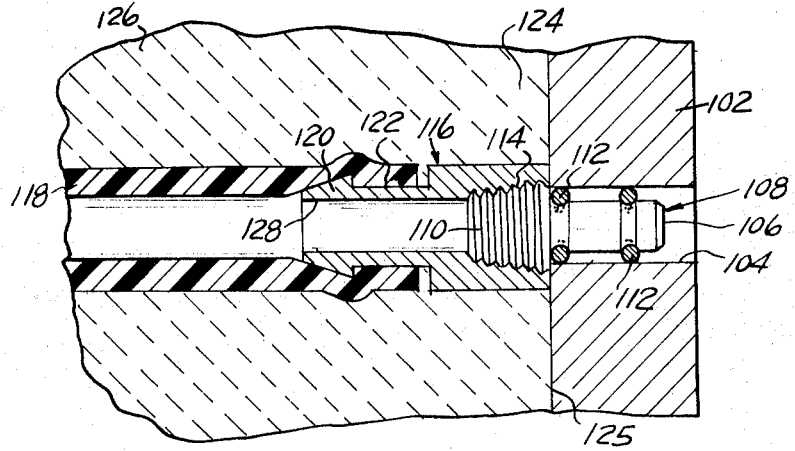
FIG. 6 is an enlarged vertical section through a portion of the block manifold adjacent the mold side wall, showing resiliently-mounted screw plug for detachably holding a threaded coupling during pouring and solidification of the synthetic plastic material which becomes the block.

Experience has shown that occasionally a plastic block will shrink sufficiently upon solidifying in the mold so as to cause cracks to appear adjacent exposed couplings or fittings, especially when there are many such couplings or fittings placed close to one another. In FIG. 6 there is shown means for preventing such cracking by resiliently mounting the tube end plugging means for preventing the flow of plastic material into the exposed open end of the fitting or coupling. In particular, in FIG. 6 the mold side wall 102 is provided with a bore 104 in which is mounted the smaller diameter shank 106 of a plug 108 having an enlarged screw-threaded head 110 and also having the annularly grooved shank 106 spaced away from the bore 104 by axially-spaced O-rings 112 seated therein. In setting up the assembly prior to pouring of the plastic, the head 110 is threaded into the correspondingly-threaded socket 114 in the pipe coupling 116 and thereby drawn tightly against the mold wall 102 so as to prevent entry of the plastic during casting. At the time of such set-up, the outer end of the plastic tube 118 is pushed over the annular barb 120 on the stem 122 of the coupling 116.

The casting plastic is then poured into the mold cavity 124 and upon solidifying becomes the plastic block 126 in which the coupling 116 and tube 118 are now embedded. Upon disassembling the mold, the withdrawal of the mold wall 102 (to the right in FIG. 6) leaves the plug 108 projecting from the surface 125 of the block 126, whereupon the operator by rotating the shank 106 unscrews the head 110 from the socket 114 and exposes the outer end of the bore 128 in the coupling 116. Any contraction or shrinkage in the block 126 during solidification is compensated for by the presence of the resilient O-rings 112 and by the clearance between the shank 106 and the bore 104.

Figures 7, 8:
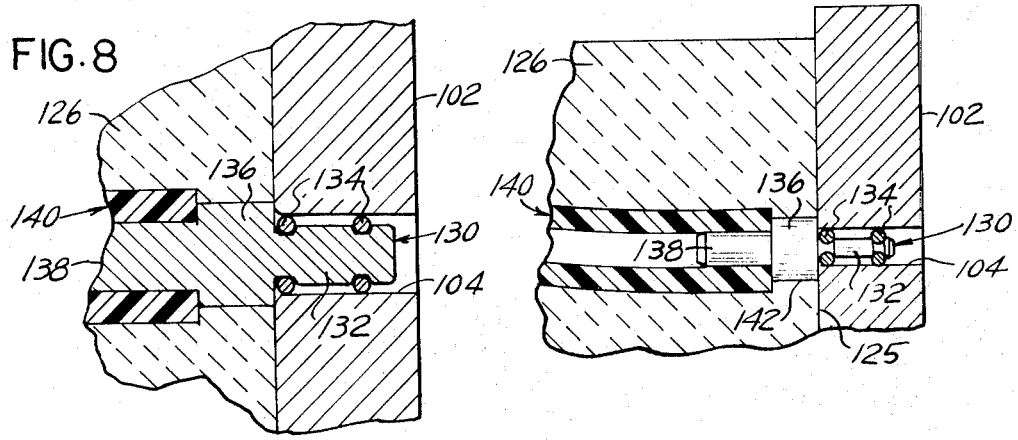
FIG. 7 is a view similar to FIG. 6, but showing a resiliently-mounted smooth plug for detachably holding the end of a tube during pouring and solidification of the synthetic plastic material which becomes the block.
FIG. 8 is a longitudinal section, upon an enlarged scale, through the smooth plug, tube and mold wall shown in FIG. 7.
Figure 9:
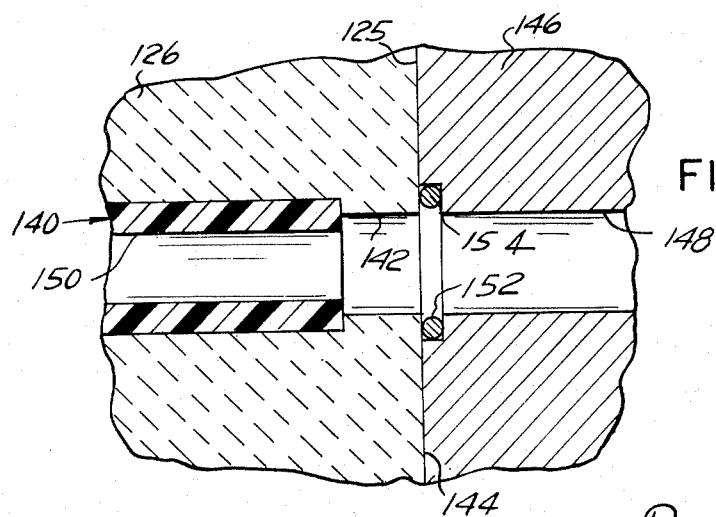
FIG. 9 is a view similar to FIG. 8 but showing the mold wall and plug withdrawn and a valve body secured to the manifold block.

The smooth plug 130 shown in FIGS. 7 and 8, is mounted in a similar manner in the bore 104 in the mold wall 102. The smooth plug 130 has a reduced diameter annularly-grooved outer shank 132 similarly mounted on spaced O-rings 134 and terminating in an enlarged head 136 beyond which a reduced diameter inner shank 136 projects inward into the mouth of a plastic tube 140. Here, again, shrinkage of the plastic of which the mold block 126 is composed does not cause cracking because the resilient O-rings 134 take up any such shrinkage automatically in the clearance between the shank 132 and the bore 104. Subsequent dismantling of the mold and the consequent withdrawal of the side wall 102 exposes the shank 132 projecting from the now solidified block 126, whereupon the operator withdraws the plug 130 by pulling outward on the shank 132, as with a pair of pliers, and thus removes the plug 130 from the block 126, assisted by a mold release coating on the head 136. This leaves the end of the tube 140 recessed into the block 126 from the surface 125 thereof at the inner end of the counterbore 142 left by the withdrawal of the head 136. As a result (FIG. 9), the flat side 144 of a body 146, such as a valve body, can be tightly secured to the block 126 in abutting relationship with the correspondingly-flat surface 125 thereof with its bore 148 communicating with the counterbore 142 and consequently with the passageway 150 through the center of the tube 140. An O-ring 152 seated in a counterbore 154 prevents leakage at the junction between the surfaces 125 and 144.

FIG. 10 is a composite view of a modification employing a mold 160 containing a flexible elastomeric liner 162 with either outwardly-projecting socket portions 164 seated in mold sockets 166 (FIG. 12) or inwardly-projecting socket portions 168 (FIG. 11) projecting inward from the liner 162. The inwardly-projecting socket portions 168 have sockets 170 receiving the outer end of the tube 172 which is recessed slightly inward from the external surface 174 of the plastic block 176 of the block manifold 175 after the synthetic plastic has solidified. As a result of this, the liner 162 containing the block 176 may be withdrawn from the mold cavity 178 without dismantling the mold 160. The liner 162 is then flexed by reason of its resilience to peel it off of the block 176 and at the same time withdraw the socket portions 168 from the counterbore 180 formed by the socket portions 168 in the plastic block 176.

Where, however, it is desired that the outer end of the tube 172 shall project from the external surface 174 of the plastic block 176, the outwardly-projecting socket portions 164 (FIG. 12) are employed and seated in the respective mold sockets 166. During the set-up operation prior to casting, the outer end of each tube 172 is caused to project into the socket 182 in its respective socket portion 164. The subsequent pouring into the mold liner cavity 184 of the liquid plastic material upon solidification embeds the tube 172 in the thus-formed plastic block 176, leaving the outer end of each tube 172 seated in its respective liner socket 182. The side walls 186 of the mold 160 must then be pulled away from the liner 162 by disassembling the mold 160, thereby pulling the mold sockets 166 away from the liner socket portions 164, whereupon the liner 162 may again be flexed outward to withdraw the socket portions 164 from the now-projecting ends of the tubes 172 from the external surface 174 of the plastic block 176.

In any of the foregoing block manifold constructions, a check valve 190 (FIG. 13) may be embedded in the plastic block 176 thereof. The check valve 190 is provided with a tubular body 192 containing a bore 194 with reduced diameter passageways 196 and 198 leading outward from the opposite ends thereof through opposite end stems 200 and 202 respectively provided with annular barbs 204 and 206 respectively. Reciprocably mounted in the bore 194 is a check valve ball 208 urged against a hemispherical valve seat 210 at the inner end of the passageway 196 by a helical compression spring 212. During set-up, the ends of tubes 214 and 216 are pushed over the barbs 204 and 206 onto the stems 200 and 202 at the opposite ends of the check valve 190. When the fluid plastic material has been poured into the liner mold cavity 184 (FIG. 10), it surrounds the tubes 214 and 216 and the check valve 190 between them (FIGS. 10 and 13). Upon solidification thereof, the check valve 190 becomes firmly embedded in the plastic manifold block 176 where it can readily be seen but cannot be tampered with.

Where it is desired or necessary to accommodate high fluid pressure within the block manifold, metal tubes are optionally employed instead of the plastic tubes mentioned above, since such metal tubes enable such higher pressures to be sustained. The flock manifold 10 or 175 may be made from any suitable synthetic plastic known in the plastics industry as a casting resin of which epoxy resin is one type and polyester resin another type. The block manifold 10 or 175 can be mounted by drilling and tapping holes in the bottom of the block and threading bolts through a mounting plate or box (not shown) into such threaded holes. In the alternative, plastic flanges may be cast integral with the block manifold 10 or 175 and these employed to bolt the block manifold directly to the machine which it is intended to control. In some installations, it is found useful to mount the block manifold in a metal box or casing having holes in its sides for the passage of the various pipes connected to the fittings, ports or nipples in the block manifold.

In casting the resin, care must be taken not to employ an excessive amount of hardener as a catalyst as this generates excessive heat which in turn sets up chemical reactions which damage or destroy the plastic tubes embedded in the resin. Tubes of polyvinyl chloride or polyurethane have been found suitable in this block manifold. Well-known hardeners for polyester resins are benzoyl peroxide and methyl ethyl ketone peroxide in dimethyl phthalate, the latter being used in the approximate amount of one drop per ounce of resin for a 5-inch thickness thereof. The amount of hardener may be decreased in proportion to the thickness of the casting, for example, six drops of hardener per ounce of resin may be used for casting up to a half-inch thickness, five drops from one-half to one inch thickness, four drops for one-inch thickness. The casting of polyester resin ordinarily jells in less than an hour at room temperature of 75° F. and best results are obtained by overnight during. During casting, the above-described O-rings of elastomeric or other resilient material effectively prevent the flow of fluid plastic material past them.

As a mold release, glycerine has been found suitable, and certain oils well-known to those skilled in this art have also been used for this purpose. For the flexible mold liner 162, latex or R T V (room temperature vulcanizable) elastomers are suitable. A semi-rigid mold may be made from polyethylene or polypropylene.

It will be understood that the shapes of the block manifolds disclosed herein may be varied in order to be best adapted to the particular installation, as long as they can be withdrawn from the mold. For example, the block manifold may be made L-shaped in order to extend around a corner of the machine being controlled.

In summation, the block manifold of the present invention has advantages over the prior manifolds of eliminating numerous fittings, mounting plates and tangles of interlacing tubes as well as reducing the volume occupied by such a maze of tubes, as the duplication of the tubes in the block manifold would require many tubes occupying a large volume of space. The employment, according to this invention, of tubes of flexible material enables many more such tubes to be mounted in the space to be subsequently occupied by the plastic block because it is believed to be self-evident that such flexible tubes can be crowded into a smaller space by threading them past one another, in that they bend automatically while being thus installed, and thus accommodate themselves to the existing space and avoid interference with one another. In contrast thereto, tubes or rigid or semi-rigid material cannot be so threaded past one another and must be individually bent, hence do not accommodate themselves to the available space and therefore either require more space or fewer tubes in the existing space. At the same time, higher pressure can be sustained in otherwise low pressure tubes by reason of their being embedded in the plastic block. When once embedded, the tubes or other internal fittings such as check valves cannot be tampered with and, if made of transparent or translucent material, can be quickly and easily inspected. The present block manifold has the further advantage over conventional metal manifolds that the embedded tubes can pass by one another whereas the channels formed in conventional manifolds cannot pass by one another but require the drilling of holes and the use of bypass tubes or jump pipes, or must employ stacked multiple channeled plates, with a consequently still higher cost of production. The cost of production of the present manifold and its consequent cost to the user is far less than that of a conventional channeled metal manifold.

Damage to the synthetic plastic tubes within the mold block by excessive heat generated by the chemical action of the hardener can be avoided by cooling the mold during the solidification period. In the present invention it has been accomplished successfully by refrigerating the mold and its contents, such as by placing them in an atmosphere at a temperature near the freezing point of water, namely 32° F. It can also be achieved by providing cooling chambers or passageways in the mold walls and circulating a coolant through these passageways. In the alternative coolant can be circulated through the tubes themselves.

In addition to the synthetic plastics mentioned above as suitable for casting, polyurethane plastic may be used for casting the mold block containing synthetic plastic tubes, and nylon plastic for casting with metal tubes.

I claim:

1. A block manifold adapted for centralized control of a fluid system, said manifold comprising a solid body of synthetic plastic material having a plurality of external surfaces thereon, a plurality of sets of conduit connection couplings embedded in said body with the opposite outer ends of each set disposed in different external surfaces of said body, and a multiplicity of longitudinally-curved tubes of flexible non-metallic material embedded in said body in closely-packed criss-crossed relationship with their outer ends extending into close proximity to said external surfaces of said body and connected to different sets of said conduit connection couplings.

2. A block manifold, according to claim 1, wherein said plastic material of said body is a substantially transparent plastic material and wherein said tubes are of a substantially transparent flexible plastic material.

3. A block manifold, according to claim 1, wherein a valve with ports therein is embedded in the interior of said solid body, and wherein certain of said tubes have inner ends connected to said ports and outer ends exposed at the exterior of said body.

4. A block manifold, according to claim 3, wherein said valve is a check valve.

5. A block manifold adapted for centralized control of a fluid system, said manifold comprising a solid body of synthetic plastic material, and a multiplicity of tubes of flexible material embedded in said body with their outer ends exposed at the exterior of said body, said body having threaded coupling portions disposed at the exposed ends of certain of said tubes, said body having barbed tubular couplings disposed at the exposed ends of others of said tubes.

* * * * *